United States Patent
Margiott et al.

(10) Patent No.: US 6,984,464 B2
(45) Date of Patent: Jan. 10, 2006

(54) HYDROGEN PASSIVATION SHUT DOWN SYSTEM FOR A FUEL CELL POWER PLANT

(75) Inventors: Paul R. Margiott, South Sindsor, CT (US); Francis R. Preli, Jr., Cromwell, CT (US); Galen W. Kulp, Vernon, CT (US); Michael L. Perry, South Glastonbury, CT (US); Carl A. Reiser, Stonington, CT (US); Ryan J. Balliet, West Hartford, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 71 days.

(21) Appl. No.: 10/635,779

(22) Filed: Aug. 6, 2003

(65) Prior Publication Data

US 2005/0031917 A1 Feb. 10, 2005

(51) Int. Cl.
*H01M 8/00* (2006.01)
(52) U.S. Cl. .................................................... 429/12
(58) Field of Classification Search ............ 429/38, 429/13, 22, 25, 34, 23, 20, 17, 40, 26, 19; 222/3; 700/79; 205/787; 422/88; 320/137
See application file for complete search history.

(56) References Cited

U.S. PATENT DOCUMENTS

| | | | |
|---|---|---|---|
| 3,748,180 A * | 7/1973 | Clausi et al. ................. 429/25 |
| 5,013,617 A | 5/1991 | Scheffler | |
| 5,045,414 A | 9/1991 | Bushnell et al. | |
| 6,024,848 A | 2/2000 | Dufner et al. | |
| 6,103,410 A * | 8/2000 | Fuller et al. .................. 429/13 |
| 6,299,996 B1 * | 10/2001 | White et al. .................. 429/22 |
| 6,399,231 B1 * | 6/2002 | Donahue et al. .............. 429/13 |
| 6,589,312 B1 * | 7/2003 | Snow et al. ................... 75/255 |
| 6,635,370 B2 * | 10/2003 | Condit et al. ................. 429/13 |
| 6,838,199 B2 * | 1/2005 | Balliet et al. ................. 429/13 |
| 2004/0126628 A1 * | 7/2004 | Balliet et al. ................. 429/13 |

* cited by examiner

Primary Examiner—Michael Barr
Assistant Examiner—Robert Hodge
(74) Attorney, Agent, or Firm—Malcolm J. Chisholm, Jr.

(57) ABSTRACT

The invention is a hydrogen passivation shut down system for a fuel cell power plant (10). An anode flow path (24) is in fluid communication with an anode catalyst (14) for directing hydrogen fuel to flow adjacent to the anode catalyst (14), and a cathode flow path (38) is in fluid communication with a cathode catalyst (16) for directing an oxidant to flow adjacent to the cathode catalyst (16) of a fuel cell (12). Hydrogen fuel is permitted to transfer between the anode flow path (24) and the cathode flow path (38). A hydrogen reservoir (66) is secured in fluid communication with the anode flow path (24) for receiving and storing hydrogen during fuel cell (12) operation, and for releasing the hydrogen into fuel cell (12) whenever the fuel cell (12) is shut down.

6 Claims, 1 Drawing Sheet

HYDROGEN PASSIVATION SHUT DOWN SYSTEM FOR A FUEL CELL POWER PLANT

TECHNICAL FIELD

The present invention relates to fuel cell power plants that are suited for usage in transportation vehicles, portable power plants, or as stationary power plants, and the invention especially relates to a system that minimizes performance degradation of fuel cells of the plant resulting from repeated shutting down and starting up of the plant.

BACKGROUND ART

Fuel cell power plants are well-known and are commonly used to produce electrical energy from hydrogen containing reducing fluid fuel and oxygen containing oxidant reactant streams to power electrical apparatus such as power plants and transportation vehicles. In fuel cell power plants of the prior art, it is well known that, when an electrical circuit connected to the fuel cells is disconnected or opened and there is no longer a load across the cell, such as upon and during shut down of the cell, the presence of air on a cathode electrode along with hydrogen fuel remaining on an anode electrode, often cause unacceptable anode and cathode potentials, resulting in oxidation and corrosion of electrode catalyst and catalyst support materials and attendant cell performance degradation.

Passivation efforts have been proposed to return the cathode electrode to a passive, non-oxidative state upon shut down of the fuel cell. For example, it was thought that inert gas needed to be used to purge both an anode flow field and a cathode flow field immediately upon cell shut down to passivate the anode and cathode electrodes so as to minimize or prevent such cell performance degradation. Further, the use of an inert gas purge avoided, on start-up, the possibility of the presence of a flammable mixture of hydrogen and air, which is a safety issue. Commonly owned U.S. Pat. Nos. 5,013,617 and 5,045,414 describe using 100% nitrogen as the anode side purge gas, and a cathode side purging mixture comprising a very small percentage of oxygen (e.g. less than 1%) with a balance of nitrogen. Both of these patents also discuss the option of connecting a dummy electrical load across the cell during the start of a purging process to lower the cathode potential rapidly to between the acceptable limits of 0.3–0.7 volt. However, the costs and complexity of such stored inert gases are undesirable especially in automotive applications where compactness and low cost are critical, and where the system must be shut down and started up frequently.

Other efforts to minimize corrosion of catalyst and catalyst support materials include shutting down a fuel cell power plant by disconnecting the primary electricity using device (hereinafter, "primary load"), shutting off the air or process oxidant flow, and controlling the hydrogen fuel flow into the system and the gas flow out of the system in a manner that results in the fuel cell gases coming to equilibrium across the cells, and maintaining a gas composition of at least 0.0001% hydrogen (by volume), balance fuel cell inert gas, during shut down. This method of fuel cell shut down also includes, after disconnecting the primary load and shutting off the air supply to the cathode flow field, continuing to supply fresh fuel to the anode flow field until the remaining oxidant is completely consumed. This oxidant consumption is preferably aided by having a small auxiliary load applied across the cell, which also quickly drives down the electrode potentials. Once all the oxidant is consumed the hydrogen fuel feed is stopped. Thereafter, during continued shut down, a hydrogen concentration is monitored; and hydrogen is added, as and if necessary, to maintain the desired hydrogen concentration level.

Known improvements to the problem of oxidation and corrosion of electrode catalysts and catalyst support materials have reduced the deleterious consequences of the presence of oxygen on the cathode electrode and a non-equilibrium of reactant fluids between the anode and cathode electrodes that result in unacceptable anode and cathode electrode potentials upon and during shut down and start up of a fuel cell. However, it has been found that even with known solutions, the presence of oxygen within an anode flow field during start up results in a reverse current leading to unacceptable, localized electrode potentials and corrosion of catalysts and catalyst support materials. Moreover, active addition of hydrogen to fuel cells of a power plant while the plant is shut down and unattended presents significant safety issues where a system failure may lead to release of potentially flammable hydrogen concentrations out of the power plant.

Consequently, there is a need for a shut down system for a fuel cell power plant that eliminates significant performance degradation of the plant, and that minimizes oxidation and corrosion within plant fuel cells at shut down of the plant, during shut down, or upon restarting the fuel cell power plant.

DISCLOSURE OF INVENTION

The invention is a hydrogen passivation shut down system for a fuel cell power plant. The system includes at least one fuel cell for generating electrical current from hydrogen containing reducing fluid fuel and process oxidant reactant streams. The fuel cell includes an anode catalyst and a cathode catalyst on opposed sides of an electrolyte; an anode flow path in fluid communication with the anode catalyst for directing the hydrogen fuel to flow through the fuel cell and to flow adjacent to the anode catalyst; and a cathode flow path in fluid communication with the cathode catalyst for directing the oxidant to flow through the fuel cell and to flow adjacent to the cathode catalyst. A hydrogen inlet valve is secured between a hydrogen containing reducing fluid fuel storage source and the anode flow path for selectively permitting the hydrogen fuel to flow into the anode flow path. An oxidant inlet valve is secured between an oxygen containing oxidant storage source and the cathode flow path for selectively permitting the oxidant to flow into the cathode flow path.

The system includes hydrogen transfer means secured in communication between the anode flow path and the cathode flow path for selectively permitting transfer of the hydrogen fuel between the anode flow path and the cathode flow path. The hydrogen transfer means may be in the form of a hydrogen transfer valve in fluid communication between the anode and cathode flow paths, an electrochemical pump for pumping hydrogen from the anode flow path through the electrolyte into the cathode flow path, or a proton exchange membrane ("PEM") electrolyte that permits diffusion of hydrogen from the anode flow path through the PEM electrolyte into the cathode flow path. Additionally, a hydrogen reservoir is secured in fluid communication with the anode flow path. The hydrogen reservoir receives and stores hydrogen whenever the hydrogen inlet valve is open to permit flow of the hydrogen fuel through the anode flow path, and the hydrogen reservoir releases the hydrogen into the anode flow path whenever the hydrogen inlet valve is closed and the hydrogen concentration in the anode flow field is reduced below a hydrogen concentration during operation of the fuel cell. The hydrogen reservoir may be hydrogen storage media, such as hydrides, that are located within the anode flow path, such as coatings on manifolds within the anode flow path, or located within porous support plates supporting or in fluid communication with the anode catalyst. The hydrogen reservoir may also be a hydrogen vessel secured outside of the fuel cell that may also have hydrogen storage media within the vessel.

In use of a preferred embodiment of the system, whenever the fuel cell is shut down, the oxidant inlet valve is closed to prohibit the oxidant from flowing into the cathode flow path, the oxygen within the cathode flow path is consumed, and then the hydrogen transfer valve is opened to permit hydrogen fuel from the fuel storage source and stored hydrogen within the hydrogen reservoir to move into the cathode flow path. When the cathode and anode flow paths are substantially filled with about 100% hydrogen, the hydrogen inlet valve is closed, and any hydrogen exhaust and oxidant exhaust valves are closed. During a shut down period, some oxygen from the atmosphere will enter the fuel cell, and hydrogen stored within the hydrogen reservoir continues to move from the reservoir into the anode and cathode flow paths to react with the oxygen and maintain a finite concentration in excess of 0.0001 percent hydrogen within the flow paths.

In another preferred embodiment of the system, a cathode recycle line including a cathode recycle blower and an oxidant blower may be secured in fluid communication between a cathode exhaust and cathode inlet of the cathode flow path. During a shut down procedure, the cathode recycle or oxidant blower may be operated after an oxidant source isolation valve is closed to rapidly cycle the hydrogen fuel from the anode flow path, through the hydrogen transfer valve and into and throughout the cathode flow path.

In an additional embodiment, the system may include a hydrogen sensor that may be utilized to determine a concentration of hydrogen fuel within the anode and cathode flow paths while the fuel cell power plant is shut down. If the sensor detects that the hydrogen concentration has declined below acceptable limits, such as below 0.0001 percent hydrogen, a controller may open the hydrogen inlet valve to actively direct hydrogen to enter the anode and cathode flow paths, while the fuel cell power plant is shut down, such as immediately prior to a start up of the plant. Output from the sensor may also be used to select a start up procedure. An exemplary start up procedure includes a rapid fuel purge wherein the hydrogen fuel is directed to traverse an anode flow field of the fuel cell in less than 1.0 seconds, or preferably in less than 0.2 seconds, and most preferably in less than 0.05 seconds to minimize oxidation and corrosion of electrode catalyst and catalyst support materials. The hydrogen sensor may be a direct hydrogen concentration sensor known in the art, or a sensor circuit in electrical communication with the catalysts of the fuel cell.

The system may also include an anode recycle line and anode recycle blower secured in fluid communication between an anode exhaust and anode inlet of the anode flow path. The anode recycle line and blower may also be in fluid communication with the reducing fluid fuel storage source so that the anode recycle blower may rapidly move the hydrogen fuel through the anode flow path.

In a further embodiment, the anode flow path may include an anode exhaust vent, and the cathode flow path may include a cathode exhaust vent, wherein both the anode exhaust vent and cathode exhaust vent are located with reference to a directional force of gravity to be below the fuel cell. Because hydrogen is lighter than oxygen, the hydrogen will tend to remain above, or within the fuel cell while atmospheric oxygen entering the flow paths during shut down will tend to flow downward, out of the anode and cathode flow paths through the anode and cathode exhaust vents, thereby aiding in preserving a finite hydrogen concentration of greater than 0.0001 percent during shut down of the fuel cell power plant.

Accordingly, it is a general purpose of the present invention to provide a hydrogen passivation shut down system for a fuel cell power plant that overcomes deficiencies of the prior art.

It is a more specific purpose to provide a hydrogen passivation shut down system for a fuel cell power plant that substantially fills and maintains an anode flow path and cathode flow path of the plant with about 100 percent hydrogen during shut down of the plant to thereby passivate fuel cell cathode and anode catalysts and catalyst support materials while the fuel cell power plant is shut down.

It is yet another purpose to provide a hydrogen passivation shut down system for a fuel cell power plant that senses hydrogen concentrations within an anode flow path and a cathode flow path of the plant during shut down of the plant and that permits additional hydrogen to enter the flow paths prior to start up of the plant to passivate fuel cell cathode and anode catalysts and catalyst support materials These and other purposes and advantages of the present hydrogen passivation shut down system for a fuel cell power plant will become more readily apparent when the following description is read in conjunction with the accompanying drawing.

DESCRIPTION OF THE PREFERRED EMBODIMENTS

Figure 1:
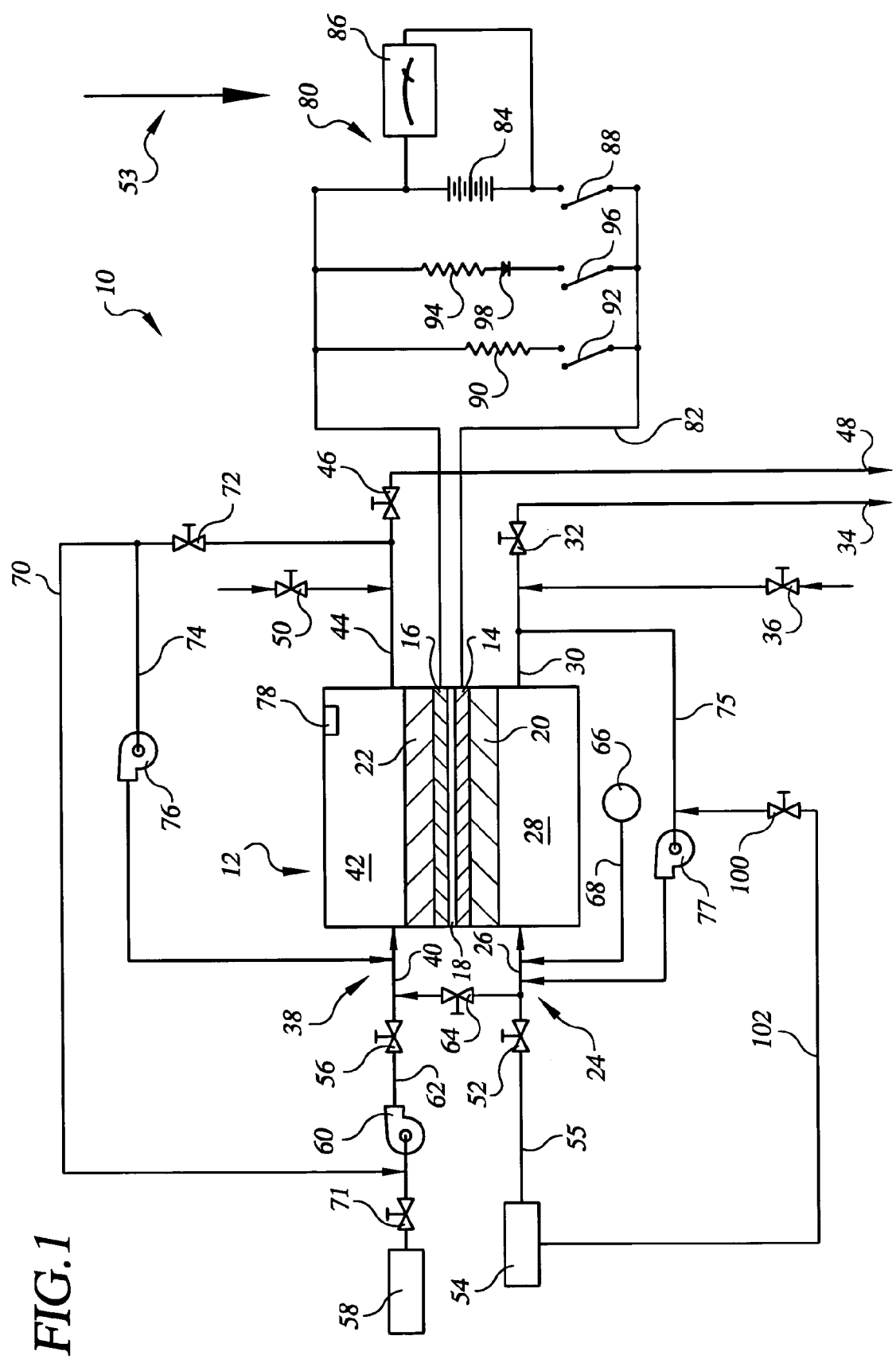
FIG. 1 is a schematic representation of a preferred embodiment of a hydrogen passivation shut down system for a fuel cell power plant constructed in accordance with the present invention.

Referring to the drawings in detail, a first embodiment of a hydrogen passivation shut down system for a fuel cell power plant is shown in FIG. 1, and is generally designated by the reference numeral 10. The system 10 includes at least one fuel cell, such as a fuel cell 12 having an anode catalyst 14 (which may also be referred to herein as an anode electrode), a cathode catalyst 16 (which may also be referred to as a cathode electrode), and an electrolyte 18 disposed between the anode and cathode. The electrolyte 18 may be in the form of a proton exchange membrane (PEM) of the type described in U.S. Pat. No. 6,024,848, or the electrolyte may be held within a ceramic matrix, such as is typically found in acid aqueous electrolyte fuel cells, such as phosphoric acid electrolyte fuel cells.

The anode catalyst 14 may be supported on an anode substrate layer 20, and the cathode electrode 16 may be supported on a cathode substrate layer 22. The system 10 also includes an anode flow path 24 in fluid communication with the anode catalyst 14 for directing a hydrogen containing reducing fluid fuel to pass from a fuel source 54 through the fuel cell 12 and adjacent to the anode catalyst 14. The anode flow path 24 includes an anode inlet 26 for directing the hydrogen fuel into the fuel cell 12, such as manifolds etc. known in the art. The anode inlet 26 is in fluid communication with an anode flow field 28, which is part of the anode flow path 24, and is defined as voids, channels, or pores of support material, in fluid communication with and adjacent to the anode catalyst 14 for directing the hydrogen fuel to pass adjacent to the anode catalyst 14. The anode flow path 24 also includes an anode exhaust 30, in fluid communication with the anode flow field 28, for directing the hydrogen fuel out of the fuel cell 12. An anode exhaust valve 32 is secured in fluid communication with the anode exhaust 30, and an anode exhaust vent 34 is secured to the anode exhaust valve 32. An anode vacuum release valve 36 in the nature of a known one-way, or check valve may be secured to the anode exhaust 30, to an anode recycle line 75, or to the anode flow path 24 to permit atmospheric air to move into the anode flow path 24 to avoid a partial vacuum forming within the anode flow path 24 during shut down of the fuel cell 12 as gases are consumed in reactions, or condensed, as is known in the art.

The system 10 also includes a cathode flow path 38 in fluid communication with the cathode catalyst 16 for directing an oxygen containing oxidant to pass through the fuel cell 12 and adjacent to the cathode catalyst 16. The cathode flow path 38 includes a cathode inlet 40 for directing the oxidant into the fuel cell 12, such as manifolds etc. known in the art. The cathode inlet 40 is in fluid communication with a cathode flow field 42, which is part of the cathode flow path 24, and is defined as voids, channels, or pores of support material, in fluid communication with and adjacent to the cathode catalyst 16 for directing the oxidant to pass adjacent to the cathode catalyst 16. The cathode flow path 38 also includes a cathode exhaust 44, in fluid communication with the cathode flow field 42, for directing the oxidant out of the fuel cell 12. A cathode exhaust valve 46 is secured in fluid communication with the cathode exhaust 44, and a cathode exhaust vent 48 is secured to the cathode exhaust valve 44. A cathode vacuum release valve 50 in the nature of a known one-way, or check valve may be secured to the cathode exhaust 44, or to the cathode flow path 38 to permit atmospheric air to move into the cathode flow path 38 to avoid a partial vacuum forming within the cathode flow path 38 during shut down of the fuel cell 12 as gases are consumed in reactions, or condensed, as is known in the art.

It is pointed out that the anode exhaust vent 34 and cathode exhaust vent 48 are both disposed below the fuel cell 12, wherein "below" is associated with a reference to a directional force of gravity as represented by a directional arrow 53 shown in FIG. 1. By having the anode exhaust vent 34 and cathode exhaust vent 48 disposed to discharge gases from the anode flow path 24 and cathode flow path 38 below the fuel cell 12, hydrogen gas being lighter than oxygen will tend to rise above the oxygen and remain within the fuel cell 12 while heavier oxygen will tend to flow in the direction of gravity 53 through the vents 34, 48 prior to any hydrogen passing through the vents 34, 48. The anode exhaust vent 34 and the cathode exhaust vent 48 may also be in the font of vacuum release valves that prevent a vacuum from forming inside the fuel cell 12.

A hydrogen inlet valve 52 is secured in fluid communication between the anode inlet 26 of the anode flow path 24 and the hydrogen containing reducing fluid fuel storage source 54 for selectively directing the hydrogen fuel to flow into the anode flow path 24. A hydrogen fuel feed line 55 may be secured between the hydrogen fuel source 54 and the hydrogen inlet valve 52. An oxidant inlet valve 56 is secured in fluid communication between an oxygen containing oxidant source 58, such as the atmosphere, and the cathode inlet 40 for selectively directing the oxidant to flow into the cathode flow path 38. An oxidant blower or compressor 60 may be secured to an oxidant feed line 62 between the oxidant source 58 and the oxidant inlet valve 56 for pressurizing the oxidant as it moves into and through the cathode flow path 38. The oxidant inlet valve 56 may be located upstream of the blower 60, or downstream of the oxidant blower 60 (as shown in FIG. 1).

The system also includes hydrogen transfer means in communication between the anode flow path 24 and the cathode flow path 38 for selectively permitting transfer of hydrogen fuel between the anode flow path 24 and the cathode flow path 38 during shut down of the fuel cell 12. The hydrogen transfer means may be a hydrogen transfer valve 64 secured in fluid communication between the anode flow path 24 and the cathode flow path 38, such as between the anode inlet 26 and the cathode inlet 40. By use of the phrase "for selectively" permitting or directing, it is meant herein that a switch or valve, such as the hydrogen transfer valve 64 may be selected to be in an open position to thereby permit flow of the hydrogen fuel between the anode flow path 24 and the cathode flow path 38, or the valve 64 may be selected to be in a closed position to prohibit flow of the hydrogen fuel or any fluid between the anode and cathode flow paths 24, 38.

Alternatively, the hydrogen transfer means may also be in the form of an electrochemical hydrogen pump, wherein hydrogen is electrochemically pumped from the anode flow path 24 to the cathode flow path 38 by passing a direct current through the fuel cell in a manner known in the art so that hydrogen is consumed at the anode catalyst 14 and evolved at the cathode catalyst 16 to increase a concentration of hydrogen in the cathode flow field 42. Such a hydrogen transfer electrochemical pump reduces an oxygen concentration within the cathode flow path 38 during shut down of the fuel cell 12 and reduces a requirement for additional valves and plumbing to achieve the reduced oxygen concentration. The hydrogen transfer means may also be in the form of a hydrogen transfer proton exchange membrane ("PEM") electrolyte 18, wherein hydrogen diffuses across the PEM electrolyte 18 until the hydrogen concentration within the cathode flow field 42 is in substantial equilibrium with the hydrogen concentration with the hydrogen concentration within the anode flow field 28. Such a hydrogen transfer means transfers hydrogen at a slower rate than the previously described hydrogen transfer valve 64 and hydrogen transfer electrochemical pump, but the hydrogen transfer PEM electrolyte is the least complicated hydrogen transfer means.

The system 10 also includes hydrogen reservoir means for storing the hydrogen fuel secured in fluid communication with the anode flow path 24. The hydrogen reservoir means may be in the form of a hydrogen vessel 66 secured outside of the fuel cell 12 (as shown in FIG. 1.) to be in fluid communication with the anode flow path 24, such as through a vessel feed line 68 being secured between the vessel 66 and the anode inlet 26 of the anode flow path 24.

Alternatively, the hydrogen reservoir means may be in the form of hydrogen storage media, such as hydrides that are secured within the anode flow path 24, such as by a coating. Additionally, the hydrogen storage media may be applied as a coating of pores of the porous anode substrate layer 20, so that hydrogen fuel is stored within the storage media as the fuel flows through the anode flow path 24. Also, the hydrogen vessel 66 may include hydrogen storage media within the vessel 66. The hydrogen storage media may also be in the form of a coating of inlet or exhaust manifolds defined within the anode inlet 26 or anode exhaust 30 so that the hydrogen storage media is in fluid communication with the hydrogen fuel passing through the anode flow path 24. The hydrogen storage media of the hydrogen reservoir means may also be a coating within the anode flow field 28 exposed to the hydrogen fuel. The hydrogen reservoir means for storing hydrogen fuel thus is able to store the hydrogen fuel as the fuel passes through the anode flow path 24 and the media may passively release the stored hydrogen into the anode flow path 24 whenever the hydrogen fuel is no longer passing from the hydrogen fuel storage source 52 through the anode flow path 24. The hydrogen reservoir means and hydrogen transfer means may be constructed so that the system 10 may achieve a hydrogen concentration in the anode flow path 24 and cathode flow path 38 of substantially pure hydrogen, wherein "substantially pure hydrogen" is a hydrogen concentration of greater than seventy percent hydrogen, or alternatively the system may achieve a concentration within the anode flow path 24 and cathode flow path 24 of essentially pure hydrogen, wherein "essentially pure hydrogen" is a hydrogen concentration of greater than ninety percent hydrogen.

The hydrogen passivation shut down system for a fuel cell power plant 10 also may include a first cathode recycle line 70 secured in fluid communication between the cathode exhaust 44 of the cathode flow path 38 and the oxidant feed line 62 upstream of the blower 60 and downstream of an oxidant source isolation valve 71 as shown in FIG. 1. A cathode recycle valve 72 may selectively permit a portion of a cathode exhaust stream to pass from the cathode exhaust 44 to the oxidant feed line 62 to pass again through the cathode flow path 38. When the oxidant source isolation valve 71 is closed, the cathode recycle blower 76 or the oxidant blower 60 may be operated continuously or intermittently during the shutdown process to accelerate a rate of oxygen reduction from the cathode flow path 38, which includes the cathode flow field 42 and associated inlet and exit manifolds and plumbing known in the art. In the absence of such a recycle flow the oxygen contained within the cathode flow path 38 manifolds would slowly diffuse into the cathode flow field 42 where it would react with hydrogen on the cathode catalyst 16. That reaction with the hydrogen would consume the hydrogen, thereby reducing the time the fuel cell 12 could be maintained in a passive state. Recycling hydrogen from the hydrogen reservoir means 66 through the first cathode recycle line 70 and cathode flow path 38 maximizes a hydrogen concentration of the fuel cell 12 at the end of a fuel cell 12 shut down process. That in turn maximizes a duration the fuel cell 12 can be maintained in a passive state without adding additional hydrogen to the fuel cell 12.

A second cathode recycle line 74 may be secured in fluid communication between the cathode recycle valve 72 and the cathode inlet 40, and a cathode recycle blower 76 may be secured to the second cathode recycle line 74 to accelerate flow through the second cathode recycle line. The system 10 may also include an anode recycle line 75 secured in fluid communication between the anode exhaust 30 and the anode inlet 26, having an anode recycle blower 77 secured to the anode recycle line 75 to accelerate flow through the anode recycle line 75.

The system 10 may also include hydrogen sensor means for detecting a concentration of hydrogen within the anode flow path 24 and the cathode flow path 38. The hydrogen sensor means may be a direct hydrogen sensor 78 or sensors known in the art secured, for example, in the cathode flow field 42 for sensing and communicating to a controller the hydrogen concentration within the cathode flow path 38 when the fuel cell power plant 10 is shut down. Such a controller may be any controller means (not shown) known in the art capable of receiving and responding to sensed information, such as a computer, electromechanical switches, a human controller, etc.

Alternatively, the hydrogen sensor means may be a sensor circuit 80 secured in electrical communication with the cathode catalyst 14 and anode catalyst 16 of the fuel cell 12, such as through an external circuit 82. The sensor circuit 80 includes a direct current power source 84 such as a D.C. conventional, regulated power supply, battery-type of power source; a voltage-measuring device means for measuring the voltage in the sensor circuit, such as a standard voltmeter 86; and a sensor circuit switch 88. The sensor circuit 80 is calibrated by establishing the voltage, at a fixed current, as a gas composition in both the anode flow field 28 and cathode flow field 42 is varied from pure hydrogen to air. The sensor circuit 80 may selectively deliver a pre-determined sensing current to the fuel cell 12 for a pre-determined sensing duration for measuring a voltage difference between the anode catalyst 14 and cathode catalyst 16 to thereby determine hydrogen concentrations within the anode flow path 24 and cathode flow path 38.

During normal operation of the fuel cell power plant 10, a primary load 90 receives electrical current generated by the fuel cell 12 through the external circuit 82, and a primary load switch 92 is closed (it is shown open in FIG. 1); an auxiliary load 94 does not receive electrical current and an auxiliary load switch 96 is open, so that the fuel cell power plant 10 is providing electricity only to the primary load 90, such as an electric motor, etc.; and the sensor circuit switch 88 is open, so that the sensor circuit 84 is not directing any electrical current to the anode and cathode catalysts 14, 16. The oxidant blower 60, and the anode exhaust recycle blower 77 are on. The oxidant inlet valve 56 and cathode exhaust valve 46 are open, as are the hydrogen inlet valve 52 and anode exhaust valve 32. The anode vacuum release valve 36 is closed so that no air flows into the anode flow path 24.

Therefore, during normal operation of the plant 10, process oxidant such as air from the oxidant source 58 is continuously delivered into the cathode flow field 42 through the cathode flow path 38, and leaves the cathode flow path 38 through the cathode exhaust vent 48. The hydrogen containing reducing fluid fuel from the fuel source 54 is continuously delivered into the anode flow field 28 through the anode flow path 24. A portion of an anode exhaust stream, containing depleted hydrogen fuel, leaves the anode flow path 24 through the anode exhaust valve 32 and the anode exhaust vent 34, while the anode recycle line 75 and anode recycle blower 77 re-circulates the balance of the anode exhaust through the anode flow path 24 in a manner well know in the prior art. Recycling a portion of the anode exhaust helps maintain a relatively uniform gas composition throughout the anode flow path 24, and permits increased hydrogen utilization. As the hydrogen passes through the anode flow field, it electrochemically reacts on the anode catalyst layer 14 in a well-known manner to produce protons (hydrogen ions) and electrons. The electrons flow from the anode catalyst 14 to the cathode catalyst 16 through the external circuit 82 to power the primary load 90.

Shutting down the operating fuel cell power plant 10 includes opening or disconnecting the primary load switch 92 (as shown in FIG. 1) in the external circuit 82 to disconnect the primary load 90. The hydrogen inlet valve 52 remains open; and the anode exhaust recycle blower 77 remains on to continue recirculation of a portion of the anode exhaust. However, the anode exhaust valve 32 will remain open or be closed depending upon the percent hydrogen in the incoming fuel. The flow of fresh air or oxidant through the cathode flow path 38 is turned off by turning off the cathode blower 60.

During shut down the auxiliary load 94 may then be connected to the external circuit 82 by closing the auxiliary load switch 96. With current flowing through the auxiliary load 94, typical electrochemical cell reactions occur, causing the oxygen concentration in the cathode flow path 38 to be reduced and cell voltage to be lowered. The application of the auxiliary load 94 is initiated while there is still sufficient hydrogen within the fuel cell 12 to electrochemically react all the oxygen remaining within the fuel cell 12. It preferably remains connected at least until the cell voltage is lowered to a pre-selected value, preferably 0.2 volts per cell or less. A diode 98, connected across the cathode catalyst 14 and anode catalyst 16, senses the cell voltage and allows current to pass through the auxiliary load 94 as long as the cell voltage is above the pre-selected value. In that way, the fuel cell 12 voltage is reduced to and thereafter limited to the pre-selected value. When the cell voltage drops to 0.2 volts per cell, substantially all the oxygen within the cathode flow field 42, and any that has diffused across the electrolyte 18 to the anode flow field 28, will have been consumed. The auxiliary load 94 may then be disconnected by opening the auxiliary load switch 96, but is preferably left connected.

The hydrogen transfer valve 64 may then be selected to an open position to permit hydrogen fuel to pass from the anode flow path 24 into the cathode flow path 38. The oxidant source isolation valve 71 is then closed, and the cathode recycle valve 72 may then be opened while the cathode recycle blower 76 or oxidant blower 60 is turned on to draw the hydrogen from the anode flow path 24 through the hydrogen transfer valve 64 and through the cathode flow path 38. Whenever the hydrogen sensor means determines that the concentration of hydrogen within the anode flow path 24 and cathode flow path 38 is about one-hundred percent (100%) hydrogen, the anode exhaust valve 32 and cathode exhaust valve 46 are closed, the hydrogen inlet valve 52, oxidant inlet valve 56, and cathode recycle valve 72 are also closed, while the hydrogen transfer valve 64 remains open. Hydrogen stored within the hydrogen reservoir means may then be passively released to maintain an elevated hydrogen concentration within the anode flow path 24 and cathode flow path 38 during shut down of the fuel cell power plant 10. It is desired to maximize the hydrogen concentration within the anode flow path 24 and cathode flow path 38 during the shut down process. Maximizing the hydrogen concentration at the end of the shut down process will maximize a time the fuel cell 12 will be maintained in a passive state without the addition of more hydrogen. A preferred hydrogen concentration at shut down is greater than seventy percent (70%) hydrogen, and a more preferred hydrogen concentration is greater than ninety percent (90%). During the shutdown period, it is preferred that the auxiliary load 94 is connected to the external circuit 82 by closing the auxiliary load switch 96. This minimizes the potential of the individual electrode or cathode catalyst 16 and cathode substrate 22 should air leak into the fuel cell 12.

During shut down of the plant 10, oxygen from the air may leak into the cathode flow path 24 or anode flow path 38 through seals, or through the anode vacuum release valve 36 or cathode vacuum release valve 50 so that the potential of the anode and cathode catalysts 14, 16 will eventually ascend above 0.2 volts relative to a hydrogen reference electrode, leading to oxidative decay within the fuel cell 12. Hydrogen gas from the reducing fluid source 54 may then be admitted prior to the electrode potential reaching 0.2 volts in order to consume the oxygen, thereby minimizing any oxidative decay. The hydrogen may be circulated throughout the anode flow path 24 by opening the anode inlet valve 52 and turning on the anode recycle blower 68 while the anode exhaust valve 32 remains closed. Alternatively, an anode recycle valve 100 secured to an anode recycle feed line 102 secured in fluid communication between the hydrogen fuel storage source 54 and the anode recycle line 75 may be opened to supply hydrogen to the anode flow path 24 while the hydrogen inlet valve 52 remains closed. Any such admitted hydrogen will also pass through the hydrogen transfer means to pass into the cathode flow path 38. The cathode recycle blower 76 or oxidant blower 60 may also be used to hasten distribution of the hydrogen throughout the cathode flow path 38. A quantity of hydrogen that is admitted to the flow paths 24, 38 may be inversely proportional to a concentration of hydrogen within the anode and cathode flow paths 24, 38. That minimizes the quantity of hydrogen that is required to maintain the fuel cell 12 in a passive state and maximizes the time the fuel cell 12 can be maintained in a passive state without addition of hydrogen to the flow paths 24, 38 during shut down of the plant 10.

The sensor circuit 80 may also be in communication with a hydrogen admitting controller means (not shown) for controlling admission of the hydrogen fuel into the anode flow path 24 and cathode flow path 38. The hydrogen admitting controller means may be any controller known in the art that can accomplish the task of admitting hydrogen into the flow paths 24, 38 upon detection by the sensor circuit 80 of a shut down monitoring voltage at about or exceeding the sensor voltage limit. Exemplary controller means include simple manual opening by a power plant operator (not shown) of the hydrogen inlet valve 52, anode recycle valve 100, or any other mechanism capable of admitting hydrogen into the flow paths 24, 38 and starting of the anode exhaust recycle blower 77 by the operator or a control system. Other controller means could include electromechanical controls integrating the voltage measuring device with the hydrogen inlet valve 52, anode recycle valve 100, as well as with the anode recycle blower 68, cathode recycle blower, such as are known in the art for opening valves and blowers, etc., in response to sensed signals.

For example, in a passive method of using the system 10, an operator (not shown) may utilize the sensor means, such as the direct sensor 78, to determine if an adequate volume of hydrogen is within the anode and cathode flow paths 24, 39 immediately prior to starting up the fuel cell 12 after a period of being shut down, such as an automobile powered by the fuel cell being shut down over night. If the sensor 78 indicates adequate hydrogen is present to maintain the anode electrode 14 and cathode electrode 16 potentials at an adequately low potential, such as less than 0.2 volts relative to a standard hydrogen electrode, than an ordinary start up may be utilized, wherein the hydrogen transfer valve 64 is closed, the hydrogen inlet valve 52, oxidant inlet valve 56 and isolation valve 71 are opened, the oxidant blower 60, is activated, the anode recycle blower 66 is activated, and the anode and cathode exhaust valve 32, 46 are opened.

However, if the sensor means detects an inadequate concentration of hydrogen, a rapid hydrogen purge may be utilized to eliminate oxygen in contact with the anode and cathode catalysts 14, 16 and the anode and cathode support substrate layers 20, 22. A rapid hydrogen fuel purge includes directing the hydrogen fuel to traverse the anode flow field 28 from the anode inlet 26 to the anode exhaust 30 in less than 1.0 seconds, or preferably in less than 0.2 seconds and most preferably in less than 0.05 seconds. Preferably the auxiliary load 94 is connected during the hydrogen purge. Air flow to the cathode flow field 42 is begun after the hydrogen purge is completed and the auxiliary load 96 removed. Such a rapid hydrogen fuel purge may be accomplished by utilization of a highly pressurized hydrogen fuel source 54 known in the art, or fuel blowers or compressors, etc. also known in the art. In this passive usage of the system 10, hydrogen is only admitted to the fuel cell 12 while an operator is present, thereby eliminating safety concerns of unattended hydrogen transfer, wherein a system malfunction might lead to release of flammable concentrations of hydrogen from the power plant 10.

In an alternative, active usage of the present hydrogen passivation shut down system 10, the sensor means may be utilized to detect when the cathode and anode electrode 14, 16 potentials ascend above the acceptable level, and then the hydrogen admitting controller responds to the sensed information from the sensor means to control the hydrogen inlet valve 52, or the anode recycle valve 100 to admit an adequate amount of hydrogen into the anode flow path 24 to reduce the electrode potential back to or below an acceptable level.

For specific embodiments of the system 10, wherein operational requirements do not anticipate long term shut downs, or for circumstances wherein the fuel cell 12 is adequately sealed to restrict unacceptable depletion of hydrogen, the system 10 may rely only upon the passive release of stored hydrogen from the hydrogen reservoir means, such as the hydrogen vessel 66 as described above. In such an embodiment, the system 10 includes hydrogen passivation of the fuel cell 12 through the steps of disconnecting the primary load 90 from the fuel cell; terminating admission of the oxidant into the cathode flow path 38 from the oxidant source, such as by shutting off the oxidant blower; operating the hydrogen transfer means to permit passage of hydrogen from the anode flow path 24 into the cathode flow path 38; shutting off flow of the hydrogen fuel into the anode flow path 24 whenever the anode flow path 24 and cathode flow path 38 are filled with a predetermined, adequate volume of hydrogen; and permitting release into the anode flow path 24, hydrogen transfer valve and cathode flow path 38 of hydrogen stored within the hydrogen reservoir means, such as from the hydrogen vessel 66. Optionally, that embodiment of the system may also include operating the cathode recycle blower to more rapidly consume oxygen within the cathode flow path 38; and closing the anode and cathode exhaust valves 32, 46 when the anode and cathode flow paths 24, 38 are filled with hydrogen.

It can be seen that the present hydrogen passivation shut down system for a fuel cell power plant 10 provides for efficient, passivation of the fuel cell catalysts or electrodes 14, 16 that reduces oxidative corrosion of the catalysts and catalyst support materials by replacing oxygen in the fuel cell 12 with hydrogen while shutting down the fuel cell 12, and for replenishing hydrogen prior to start up of the fuel cell, either passively or actively, depending upon requirements of the system 10.

While the present invention has been disclosed with respect to the described and illustrated embodiments, it is to be understood that the invention is not to be limited to those embodiments. Accordingly, reference should be made primarily to the following claims rather than the foregoing description to determine the scope of the invention.

What is claimed is:

1. A hydrogen passivation shut down system for a fuel cell power plant (10), the system comprising:
   a. at least one fuel cell (12) for generating electrical current from hydrogen containing reducing fluid fuel and oxygen containing oxidant reactant streams, the fuel cell (12) including an anode catalyst (14) and a cathode catalyst (16) on opposed sides of an electrolyte (18), an anode flow path (24) in fluid communication with the anode catalyst (14) for directing the hydrogen fuel to flow through the fuel cell (12) and adjacent the anode catalyst (14), and a cathode flow path (38) in fluid communication with the cathode catalyst (16) for directing the oxidant stream to flow through the fuel cell (12) and adjacent the cathode catalyst (14);
   b. a hydrogen inlet valve (52) secured between a hydrogen containing reducing fluid fuel source (54) and the anode flow path (24) for selectively permitting the hydrogen fuel to flow into the anode flow path (24);
   c. an oxidant inlet valve (56) secured between an oxygen containing oxidant source (58) and the cathode flow path (38) for selectively permitting the oxidant to flow into the cathode flow path (38);
   d. hydrogen transfer means secured in communication between the anode flow path (24) and the oxidant flow path (38) for selectively permitting flow of the hydrogen fuel between the anode flow path (24) and the cathode flow path (38);
   e. hydrogen reservoir means secured in fluid communication with the anode flow path (24) for storing the hydrogen fuel whenever the hydrogen inlet valve (52) is open to permit flow of the hydrogen fuel through the anode flow path (24), and for releasing hydrogen fuel into the anode flow path (24) whenever the hydrogen inlet valve (52) is closed; and,
   f. wherein the hydrogen reservoir means comprises a hydrogen storage media secured within a porous anode substrate layer (20) supporting the anode catalyst (14).

2. A hydrogen passivation shut down system for a fuel cell power plant (10), the system comprising:
   a. at least one fuel cell (12) for generating electrical current from hydrogen containing reducing fluid fuel and oxygen containing oxidant reactant streams, the fuel cell (12) including an anode catalyst (14) and a cathode catalyst (16) on opposed sides of an electrolyte (18), an anode flow path (24) in fluid communication with the anode catalyst (14) for directing the hydrogen fuel to flow through the fuel cell (12) and adjacent the anode catalyst (14), and a cathode flow path (38) in fluid communication with the cathode catalyst (16) for directing the oxidant stream to flow through the fuel cell (12) and adjacent the cathode catalyst (14);
   b. a hydrogen inlet valve (52) secured between a hydrogen containing reducing fluid fuel source (54) and the anode flow path (24) for selectively permitting the hydrogen fuel to flow into the anode flow path (24);
   c. an oxidant inlet valve (56) secured between an oxygen containing oxidant source (58) and the cathode flow path (38) for selectively permitting the oxidant to flow into the cathode flow path (38);
   d. hydrogen transfer means secured in communication between the anode flow path (24) and the oxidant flow path (38) for selectively permitting flow of the hydrogen fuel between the anode flow path (24) and the cathode flow path (38);
   e. hydrogen reservoir means secured in fluid communication with the anode flow path (24) for storing the hydrogen fuel whenever the hydrogen inlet valve (52) is open to permit flow of the hydrogen fuel through the anode flow path (24), and for releasing hydrogen fuel into the anode flow path (24) whenever the hydrogen inlet valve (52) is closed; and, f. wherein the hydrogen transfer means comprises a hydrogen transfer electrochemical pump including a direct current source secured in electrical communication with the fuel cell (12) so that hydrogen is consumed at the anode catalyst (14) and evolved at the cathode catalyst (16).

3. A hydrogen passivation shut down system for a fuel cell power plant (10), the system comprising:

a. at least one fuel cell (12) for generating electrical current from hydrogen containing reducing fluid fuel and oxygen containing oxidant reactant streams, the fuel cell (12) including an anode catalyst (14) and a cathode catalyst (16) on opposed sides of an electrolyte (18), an anode flow path (24) in fluid communication with the anode catalyst (14) for directing the hydrogen fuel to flow through the fuel cell (12) and adjacent the anode catalyst (14), and a cathode flow path (38) in fluid communication with the cathode catalyst (16) for directing the oxidant stream to flow through the fuel cell (12) and adjacent the cathode catalyst (14);

b. a hydrogen inlet valve (52) secured between a hydrogen containing reducing fluid fuel source (54) and the anode flow path (24) for selectively permitting the hydrogen fuel to flow into the anode flow path (24);

c. an oxidant inlet valve (56) secured between an oxygen containing oxidant source (58) and the cathode flow path (38) for selectively permitting the oxidant to flow into the cathode flow path (38);

d. hydrogen transfer means secured in communication between the anode flow path (24) and the oxidant flow path (38) for selectively permitting flow of the hydrogen fuel between the anode flow path (24) and the cathode flow path (38);

e. hydrogen reservoir means secured in fluid communication with the anode flow path (24) for storing the hydrogen fuel whenever the hydrogen inlet valve (52) is open to permit flow of the hydrogen fuel through the anode flow path (24), and for releasing hydrogen fuel into the anode flow path (24) whenever the hydrogen inlet valve (52) is closed; and, f. a cathode bypass valve (72) secured in fluid communication with a cathode exhaust (44) of the cathode flow path (38), a cathode bypass line (74) secured in fluid communication between the cathode bypass valve (72) and a cathode inlet (40) of the cathode flow path (24), and one of a cathode bypass blower (76) secured to the cathode bypass line (74) or an oxidant blower (60) secured to the cathode inlet (40) for selectively directing and accelerating flow of a cathode exhaust stream from the cathode exhaust (44) through the cathode inlet (40) of the cathode flow path (24).

4. A hydrogen passivation shut down system for a fuel cell power plant (10), the system comprising:

a. at least one fuel cell (12) for generating electrical current from hydrogen containing reducing fluid fuel and oxygen containing oxidant reactant streams, the fuel cell (12) including an anode catalyst (14) and a cathode catalyst (16) on opposed sides of an electrolyte (18), an anode flow path (24) in fluid communication with the anode catalyst (14) for directing the hydrogen fuel to flow through the fuel cell (12) and adjacent the anode catalyst (14), and a cathode flow path (38) in fluid communication with the cathode catalyst (16) for directing the oxidant stream to flow through the fuel cell (12) and adjacent the cathode catalyst (14);

b. a hydrogen inlet valve (52) secured between a hydrogen containing reducing fluid fuel source (54) and the anode flow path (24) for selectively permitting the hydrogen fuel to flow into the anode flow path (24);

c. an oxidant inlet valve (56) secured between an oxygen containing oxidant source (58) and the cathode flow path (38) for selectively permitting the oxidant to flow into the cathode flow path (38);

d. hydrogen transfer means secured in communication between the anode flow path (24) and the oxidant flow path (38) for selectively permitting flow of the hydrogen fuel between the anode flow path (24) and the cathode flow path (38);

e. hydrogen reservoir means secured in fluid communication with the anode flow path (24) for storing the hydrogen fuel whenever the hydrogen inlet valve (52) is open to permit flow of the hydrogen fuel through the anode flow path (24), and for releasing hydrogen fuel into the anode flow path (24) whenever the hydrogen inlet valve (52) is closed; and, f. an anode exhaust vent (34) secured in fluid communication with the anode flow path (24) for directing an anode exhaust stream away from the fuel cell (12) out of the power plant (10), and a cathode exhaust vent (48) secured in fluid communication with the cathode flow path (38) for directing a cathode exhaust stream away from the fuel cell (12) and out of the power plant (10), wherein the anode exhaust vent (34) and cathode exhaust vent (48) are secured below the fuel cell (12) with respect to a directional force of gravity (53).

5. The system of claim 4, wherein the anode exhaust vent (34) is a vacuum release valve and the cathode exhaust vent (48) is a vacuum release valve to prevent a vacuum from forming inside the fuel cell (12).

6. A hydrogen passivation shut down system for a fuel cell power plant (10), the system comprising:

a. at least one fuel cell (12) for generating electrical current from hydrogen containing reducing fluid fuel and oxygen containing oxidant reactant streams, the fuel cell (12) including an anode catalyst (14) and a cathode catalyst (16) on opposed sides of an electrolyte (18), an anode flow path (24) in fluid communication with the anode catalyst (14) for directing the hydrogen fuel to flow through the fuel cell (12) and adjacent the anode catalyst (14), and a cathode flow path (38) in fluid communication with the cathode catalyst (16) for directing the oxidant stream to flow through the fuel cell (12) and adjacent the cathode catalyst (14);

b. a hydrogen inlet valve (52) secured between a hydrogen containing reducing fluid fuel source (54) and the anode flow path (24) for selectively permitting the hydrogen fuel to flow into the anode flow path (24);

c. an oxidant inlet valve (56) secured between an oxygen containing oxidant source (58) and the cathode flow path (38) for selectively permitting the oxidant to flow into the cathode flow path (38);

d. hydrogen transfer means secured in communication between the anode flow path (24) and the oxidant flow path (38) for selectively permitting flow of the hydrogen fuel between the anode flow path (24) and the cathode flow path (38);

e. hydrogen reservoir means secured in fluid communication with the anode flow path (24) for storing the hydrogen fuel whenever the hydrogen inlet valve (52)

is open to permit flow of the hydrogen fuel through the anode flow path (24), and for releasing hydrogen fuel into the anode flow path (24) whenever the hydrogen inlet valve (52) is closed; and, f. a hydrogen sensor means secured in communication with the fuel cell (12) for detecting a concentration of hydrogen within the anode flow path (24) and the cathode flow path (38), wherein the hydrogen sensor means comprises a sensor circuit (80) secured in electrical communication with an external circuit (82), which external circuit (82) is secured in electrical communication with the anode catalyst (14) and the cathode catalyst (16) the sensor circuit (80) including a power source (84), a voltage-measuring device (86), and a sensor circuit switch (88), the sensor circuit (80) being secured to the fuel cell (12) so that the power source (84) may selectively deliver a pre-determined sensing current to the fuel cell (12) for a pre-determined sensing duration for measuring a voltage, difference between the anode catalyst (14) and cathode catalyst (16).

* * * * *